Nov. 19, 1968     C. T. BICKNER     3,411,677

APPARATUS FOR MAKING ORNAMENTAL BOWS

Filed Oct. 21, 1965     7 Sheets-Sheet 1

INVENTOR.
CLARENCE T. BICKNER

BY *Gregg & Stidham*
ATTORNEY

Nov. 19, 1968     C. T. BICKNER     3,411,677

APPARATUS FOR MAKING ORNAMENTAL BOWS

Filed Oct. 21, 1965     7 Sheets-Sheet 2

INVENTOR.
CLARENCE T. BICKNER

BY *Gregg & Stidham*

ATTORNEY

Nov. 19, 1968    C. T. BICKNER    3,411,677
APPARATUS FOR MAKING ORNAMENTAL BOWS
Filed Oct. 21, 1965    7 Sheets-Sheet 3

INVENTOR.
CLARENCE T. BICKNER

BY *Gregg & Stidham*
ATTORNEY

Nov. 19, 1968  C. T. BICKNER  3,411,677
APPARATUS FOR MAKING ORNAMENTAL BOWS
Filed Oct. 21, 1965  7 Sheets-Sheet 4

INVENTOR.
CLARENCE T. BICKNER
BY Gregg & Stidham
ATTORNEY

Nov. 19, 1968     C. T. BICKNER     3,411,677
APPARATUS FOR MAKING ORNAMENTAL BOWS
Filed Oct. 21, 1965     7 Sheets—Sheet 5

INVENTOR.
CLARENCE T. BICKNER
BY *Gregg & Stilham*
ATTORNEY

INVENTOR.
CLARENCE T. BICKNER

BY
ATTORNEYS

Nov. 19, 1968   C. T. BICKNER   3,411,677
APPARATUS FOR MAKING ORNAMENTAL BOWS
Filed Oct. 21, 1965   7 Sheets-Sheet 7

INVENTOR.
CLARENCE T. BICKNER
BY
ATTORNEYS

United States Patent Office 3,411,677
Patented Nov. 19, 1968

3,411,677
APPARATUS FOR MAKING
ORNAMENTAL BOWS
Clarence T. Bickner, 957 Manor Road,
El Sobrante, Calif. 94803
Continuation-in-part of application Ser. No. 396,923,
Sept. 16, 1964. This application Oct. 21, 1965, Ser.
No. 505,589
2 Claims. (Cl. 223—46)

ABSTRACT OF THE DISCLOSURE

Apparatus for making ornamental bows from tape or ribbon, such apparatus being in the form of a flat base formed with means to detachably secure a bow pin with its spike projecting upwardly and permitting removal of the bow pin when a bow has been formed, such base being also formed with concentric guide circles and/or radial guide lines centered on or radiating from such attachment means, such guide means serving as an aid in making bows.

---

This invention relates to a novel apparatus and to a novel method for making ornamental bows from ribbon.

This application is a continuation-in-part of my copending application entitled, "Apparatus For Making Ornamental Bows," filed Sept. 16, 1964, Ser. No. 396,923 and now abandoned.

Ornamental bows may be used for decorating purposes such as for the decoration of gift packages and the like. Often bows are made from the same ribbon used to wrap the package. Bows made by hand without the use of a bow making apparatus generally are not of a uniform shape and therefore often are not very attractive. Apparatus for making bows is known but such apparatus is generally relatively complicated and often is limited to producing only a few different shapes, sizes and designs of bows.

In certain previous bow making devices a bow pin is supported by a peg or the like at a distance, e.g. an inch, more or less, above a base or plate, or above a table or other working surface. As a result, the ribbon must be supported, and the leaves, loops or points of the bow must be supported in mid-air while the bow is being formed. This makes it difficult to form a bow. In one such device, the central peg or bow pin support is surrounded by a series of pegs arranged in a circle around the central peg; each loop of the bow, as it is formed, is looper around one of the outer pegs; and the outer pegs serve to support the loops or points until the bow is completed and is removed from the device. However, this device and the method of bow making that it requires are cumbersome, and the variety of bows that can be made with a given device is greatly limited.

In another previous bow making device a flat base is provided which has means for securing a bow pin in a central location close to the working surface of the base and which has radially projecting fingers around its preiphery around which the ribbon is looped to form the loops or points of a bow. To enable one to detach the bow when it has been completed, it is necessary to make the fingers of flexible material such that they can be bent over upon themselves to release the loops of the bow. Such device involves difficulty in releasing a completed bow and, like the circular peg arrangement described above, it has very limited capacity for making different types of bows.

An object of this invention is the provision of a bow making apparatus which avoids the above-mentioned shortcomings of prior art apparatus for making ornamental bows.

An object of this invention is the provision of a novel apparatus for making ornamental bows by means of which an almost infinite number of sizes, shapes and designs of bows may be made.

An object of this invention is the provision of a novel bow making apparatus which eliminates the need for upstanding posts about which the ribbon is looped when making the bow.

A further object of this invention is to provide a novel method for making ornamental bows from ribbon, such method being easily mastered by ordinary, unskilled persons; being capable of quickly producing bows which are accurate and attractive; and being adaptable to the preparation of a wide variety of bows, both as to shape and size.

In the bow making device and method of the present invention, a flat, plate-like base is provided and means are incorporated in such base to detachably hold a bow pin with its spike projecting upwardly from the base; i.e. the base is so constructed that a bow pin can be supported with its spike directed upwardly to impale the ribbon repeatedly as a bow is made and to hold the loops or points of the bow together during and after formation of the bow, but this pin can be detached from the base after the bow is completed without having to remove it from the bow. Meanwhile, during formation of the bow, each loop or point is formed against (i.e., in physical contact with) the base, and the loop is held in compression, thereby avoiding the difficulties inherent in forming a bow in mid-air. No pegs are used to form the bow; no flexible fingers are employed to form the loops or points of the bow; and all that is required after the bow has been completed is to release the bow pin from its support, thereby releasing the bow with the bow pin remaining in it to lock the loops or points in place. This greatly simplified device of my invention and my novel method are facile; they enable an inexperienced and unskilled person to make bows of excellent quality very quickly and with little or no training; and they permit the formation of a very large variety of bows, whereby bows of many or few points or loops, of different radii, and even complex bows including many variations of simple bows, can be made.

Certain embodiments of my invention are illustrated by the accompanying drawings, wherein.

Figure 1:
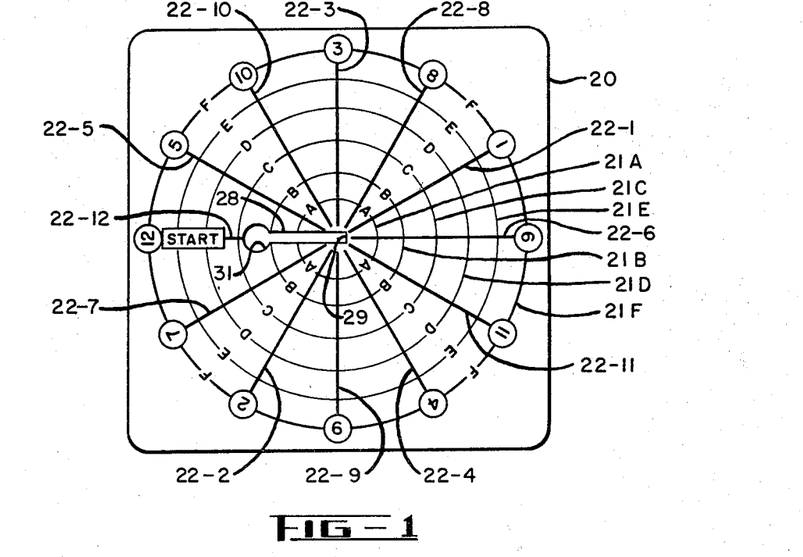
FIGURE 1 is a plan view of a base member which is included in one embodiment of a novel bow making apparatus of this invention.

Referring now to FIGURE 1 of the drawings, the embodiment of the invention there shown includes a base member 20 which comprises a flat plate of any desired geometric shape. In FIGURE 1 the base member is in the form of a square having rounded corners. It will be understood, however, that the base member may be circular or of any other desired shape. Further, it may be made of any suitable material such as metal, plastic, cardboard or the like. In accordance with this invention the base member is provided with a plurality of concentric rings designated 21A, 21B, 21C, 21D, 21E, and 21F which rings may be printed or otherwise suitably formed thereon. For ease in identification of the rings during use of the apparatus the rings 21A through 21F are labeled A through F respectively. Also in accordance with this invention a plurality of radial lines are printed or otherwise suitably formed on the base member which lines extend from about the center of the concentric rings to about the outer ring 21F. In the illustrated arrangement 12 such radial lines designated 22–1 through 22–12 are shown equally angularly spaced apart at angles of 30°. Each of the 12 radially extending lines 22 may be individually numbered from 1 to 12 which numbering serves to guide the operator in forming the loops of the bow in proper sequence. It will be noted that consecutive numbers are located at generally opposite (but not diagonally opposite) sides of the center. Thus, it will be seen that the No. 2 radial line is displaced 150° from the No. 1 line, that the No. 3 radial line is displaced 150° from the No. 5 line, etc. In addition the No. 12 radius is marked by the word "START" for reasons which will become apparent.

Figure 11:
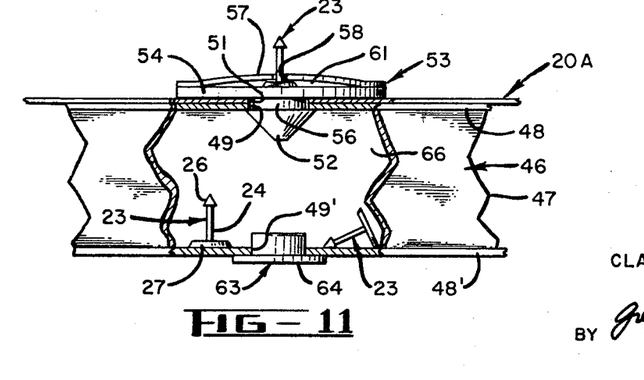
FIGURE 11 is a fragmentary side view of a ribbon spool with the novel bow-making apparatus of this invention attached thereto, parts being shown broken away for clarity.

A bow pin 23 (see FIGURE 2) is removably mounted on the base member 20 at the center of the pattern of concentric rings 21 and radial lines 22. As best seen in FIGURE 11, each of the bow pins 23 comprises an elongated shank 24 formed with a pointed barb 26 at one end and a radially extending flange or base 27 at the other end thereof. To removably secure the fastening element 23 to the base member 20, an elongated slot 28 shown in FIGURE 1 is formed in the base member 20, one end 29 of which slot terminates adjacent the center of the pattern on the base. In the embodiment shown in FIGURES 1 through 6, the slot terminates at the other end thereof in an enlarged circular shaped section 31 having a diameter slightly greater than the diameter of the flange 27 of the bow pin 23. The bow pin is secured to the base member by simply extending the flange 27 thereof through the enlarged diameter end 31 of the slot, and then sliding the pin to the other end of the slot into the position shown in FIGURE 2. In use the flange 27 on the bow pin at the bottom of the flat plate 20 rests upon any suitable flat surface (not shown) and provides a pivot about which the entire apparatus may be rotated. The shank 24 of the bow pin extends upwardly through the slot 28 with the barbed-like end 26 a short distance above the surface of the plate 20. The plate or base member 20 is relatively thin so as to extend only a short distance along the shank of the bow pin. The bow pin 23 may be made of plastic or any other suitable material as desired.

With the bow pin 23 in position at the center of the flat plate 20, the apparatus is ready for forming a bow. For a righthanded person the first step in forming a bow with the apparatus would be to orient the plate such that the word "START" printed thereon is in a normal reading position. As seen in FIGURE 1, this is a left-hand most position and in terms of the numerals on a clock's face this would correspond to the 9 o'clock position. (It will be understood that for a left-handed person the base 20 would be rotated 180° from that shown in FIGURE 1 placing the "START" position to the right.) A bow pin 23 is inserted through the enlarged diameter part 31 of the slot 28 and then slid to the other end 29 of the slot at the center of the pattern thereon as shown in FIGURE 2.

The ribbon designated 36 from which the bow is to be formed is impaled on the bow pin 23 adjacent one end of the ribbon. Bows may be made from ribbon or ribbons of any suitable material. Commonly fabric ribbons are used but the apparatus of this invention is not limited to use in making bows from fabric ribbon alone. It is, of course, necessary that the ribbon material be penetrable by the pointed barb 26 of the bow pin. Also, ribbon of any desired width may be employed in making bows with the apparatus of this invention.

Figure 2:
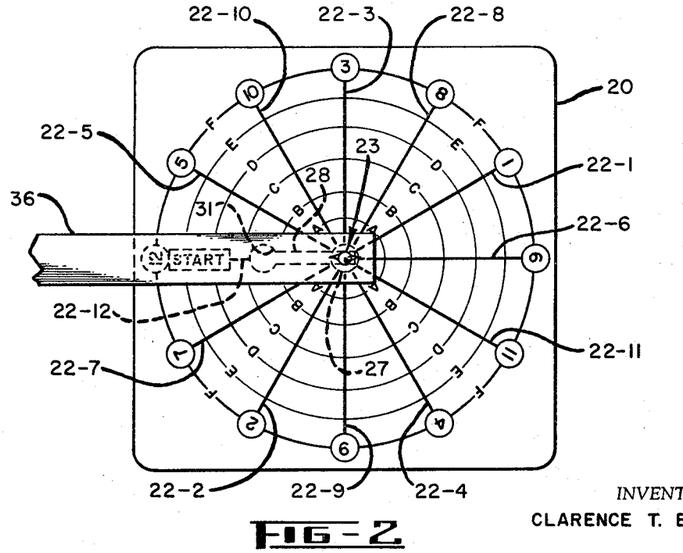
FIGURE 2 is a plan view which is similar to FIGURE 1 but showing also a bow pin and ribbon, and illustrating the first step in forming a bow with the apparatus of this invention.
Figure 3:
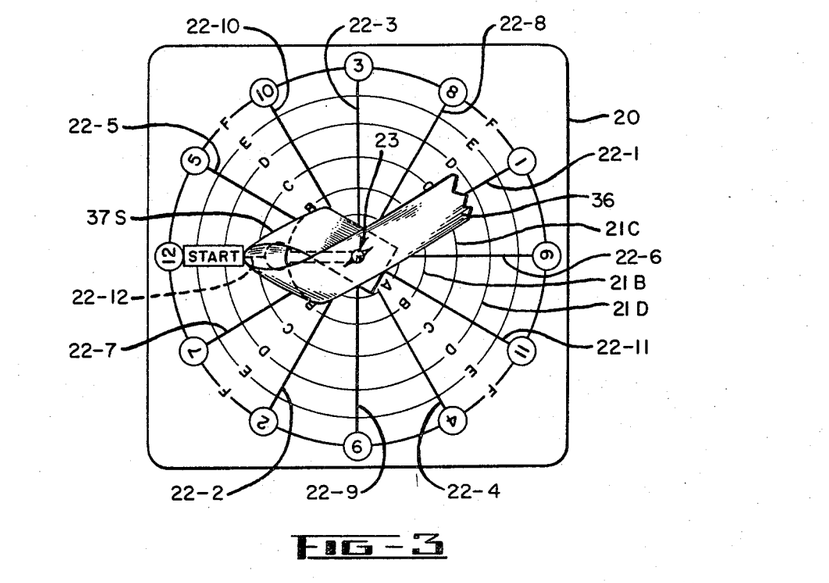
FIGURE 3 is a plan view similar to FIGURE 2 illustrating another step in forming the bow following formation of the first loop thereof.
Figure 4:
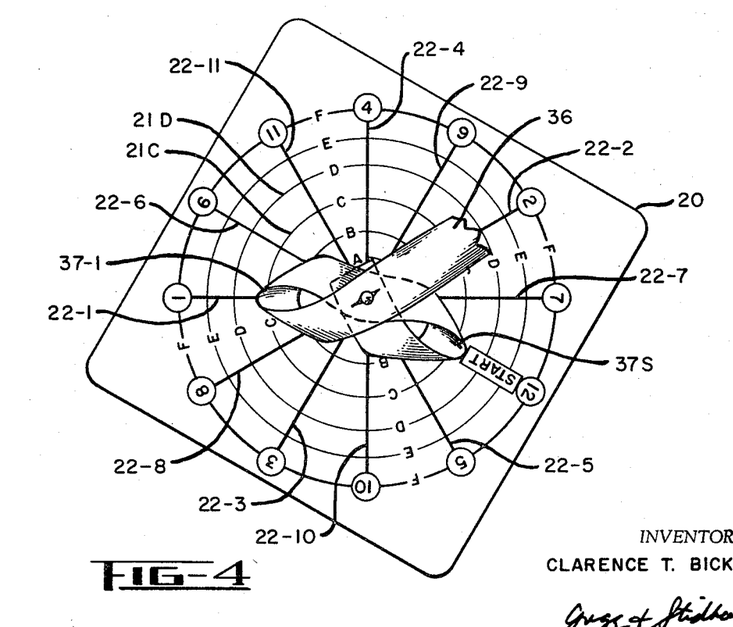
FIGURE 4 is a plan view similar to FIGURE 3 but showing the base member and attached ribbon rotated about 180° and also illustrating another step following formation of a second loop of the ornamental bow.

The ribbon 36 (of which only a fragmentary portion is shown in FIGURE 2) is extended over the word "START" at the No. 12 radial line in preparation of forming the first loop. A first loop 37S is then formed in the ribbon as seen in FIGURE 3 by circling the ribbon back on to itself and again impaling the same on the pointed bow pin 23. The outer end of the loop is curved downwardly and engages the surface of the base member 20 along the radial line 22–12 at the "START" position. The loop is formed by circling the ribbon in a counterclockwise direction such that the supply end of the ribbon extends along the No. 1 radial line 22–1. With this apparatus loops of any desired size may be formed. The concentric circles 21 function as a guide for making loops of uniform size, the end of the loop 37S being shown extending to a point intermediate the concentric circles 21C and 21D.

The entire apparatus together with the loop 37S is then rotated on the flanged portion 27 of the bow pin 23 in a clockwise direction about the axis of said bow pin to a position wherein the No. 1 radial line is at the 9 o'clock position previously occupied by the No. 12, or "START" radial line. A second loop 27–1 is then formed in exactly the same manner as the loop 37S by again circling the ribbon back onto itself and again impaling the same on the bow pin 23. The outer end of this loop 37–1 is also curved downwardly and engages the base plate 20, this time along the radial line 22–1. The supply end of the ribbon now extends along the No. 2 radial line 22–2. The second loop 37–1 may be made of the same size as the first loop 37S with the aid of the concentric circles 21.

The apparatus with the partially formed bow is then rotated clockwise to a position wherein the No. 2 radial line 22–2 is at the 9 o'clock position and a third loop 37–2 is then formed in the same manner as the loops 37S and 37–1. Loops 37–3 through 37–12 (see FIGURE 5) are then formed in succession along the radial lines 22–3 through 22–12, respectively, in the same manner as described above with the apparatus being rotated clockwise each time a loop of the bow is formed. In this manner each loop of the bow may be formed by the same movement of the operator's hand to simplify the loop-forming operation. It will be noted that the loop 37–12 is formed directly over the first loop 37S whereby a total of 13 loops are formed along the 12 radial lines 22, with the two loops 37S and 37–12 being formed along the one radial line 22–12. After removal of the bow from the base plate 20 as described hereinbelow, the first loop 37S is pivoted about the bow pin to cover the base of the bow pin to hide the same from view.

Figure 5:
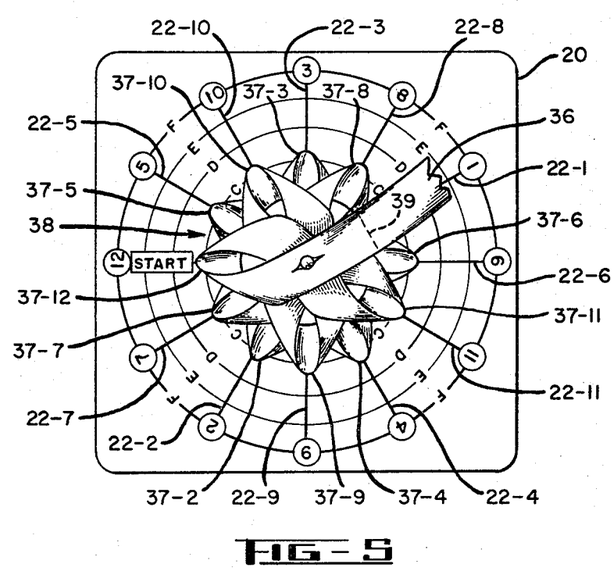
FIGURE 5 is a plan view similar to FIGURE 4 illustrating another step in the formation of the bow and showing thirteen loops of one size are already formed on the apparatus.

As seen in FIGURE 5 the loops 37–1 through 37–12 comprise a set designated 38 in which the loops are of the same size. This set 38 of equal sized loops forms a bow which may be used for any desired ornamental purpose. After formation of the loop 37–12 the ribbon may be severed as along the line 39 shown in FIGURE 5 and the bow removed from the base member 20 by simply sliding the bow pin 23 along the slot 28 and then lifting the same through the enlarged diameter portion 31 of the slot. The loops 37 of the bow remain impaled on the bow pin 23 which then comprises a part of the bow. Once the bow is removed from the base, it is inverted for use as a decoration or ornament. As mentioned above, when the bow is removed from the base plate the first-formed loop 37S is rotated about the bow pin so as to extend directly over the flanged end thereof to hide the same from view.

Figure 6:
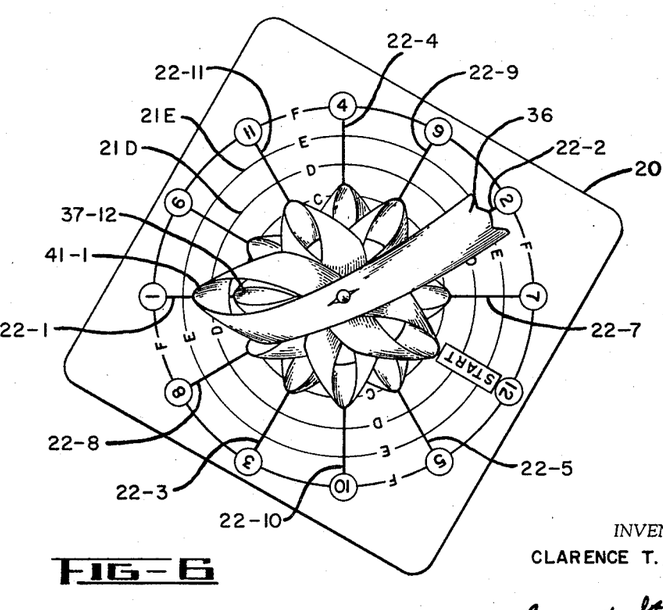
FIGURE 6 is a plan view similar to FIGURE 5 illustrating another step of the method following formation of the first larger size bow loop.

If desired, a second set of loops of increased size may be added to the first set 38 shown in FIGURE 5 to increase the size of the bow as well as add to the fullness and enhance the appearance thereof. The second set of loops may be made of either the same or different ribbon material as desired. If the same ribbon is to be used, the ribbon is not severed along the line 39 shown in FIGURE 5. Instead the base and detached bow section 38 is rotated clockwise to the position shown in FIGURE 6 wherein the No. 1 radial line 22–1 is again at the 9 o'clock position. A loop 41–1 is then formed along the No. 1 radial line 22–1 which loop is larger than the loop 37 of the first set 38. The loop 41–1 is formed in the same manner as the other loops as described above. In FIGURE 6 the outer end of the loop 41–1 is shown extending to a point intermediate the D and E concentric rings 21D and 21E, respectively. In the same manner loops are formed along the radial lines 22–2 through 22–12 (which loops are not shown) and which have the same size as the loop 41–1 illustrated in FIGURE 6. Again, the concentric circles 21 provide a guide for accurately forming loops of the same size and the radial lines 22 serve as a guide for accurately radially positioning each of the loops 41. When the second set of loops 41 has been formed a bow is completed and may be removed from the base plate 20 in the manner described above. It will here be understood that when the apparatus is used by a left-handed person the bow would be started with the base plate rotated 180° from the position shown in FIGURE 1, and the numbered radial lines would be followed in a reverse sequence. Instead of numbering the radial lines on the base plate, the lines may be printed in two different colors with adjacent lines being of different colors. The operator could then make the bows in the same manner as described above with consecutively formed loops formed along different colored radial lines.

It will be apparent that the size of loops may be varied as desired, it not being necessary to form all of the loops of one set of the same size. If desired, the size of the loops in any set may be varied to form a bow of any desired over-all shape. It should also be noted that the base plate or member 20 may be formed with greater or fewer concentric circles 21 and radial lines 22. By increasing or decreasing the number of radial lines 22, bows with greater or fewer loops may be formed in the manner described above. Also, broken or full lines may be used in forming the concentric circles and radial lines on the base plate, as described. In general, it may be stated that the circles 21 control the size of the bow while the radial lines 22 and the guide numerals 1 through 12 control the shape of the bow.

For convenience, the device of this invention may be attached to or form a part of the roll upon which ribbon is normally carried. In FIGURE 11 to which reference is now made a fragmentary portion of a ribbon roll, or spool, 46 is shown comprising a tubular center section 47 having end discs 48 and 48′ attached to the opposite ends thereof as by cementing or other suitable means not shown. The edges of the discs 48 and 48′ extend outwardly beyond the edge of the center cylinder 47 to guide the ribbon, not shown, wound upon the said tubular center section 47. The discs 48 and 48′ also close the ends of the tube 46 and axial holes 49 and 49′, respectively, are formed in the discs for securing the roll to a mandrel when winding the ribbon thereon. Such spools are of well known design and need not be described in any further detail.

Figure 9:
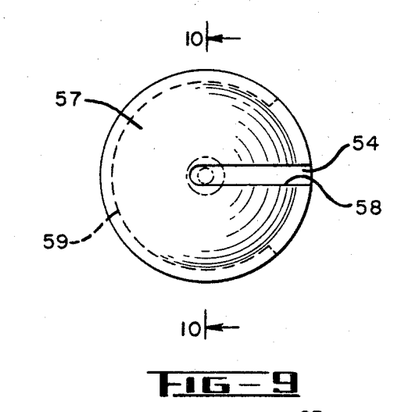
FIGURE 9 is a plan view of a modified form of holder for holding the bow pin in an upright position.
Figure 10:
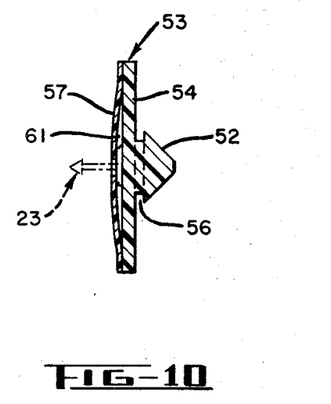
FIGURE 10 is a cross sectional view taken on line 10—10 of FIGURE 9.

In accordance with this invention a base member 20A may be secured to the face of one of the discs 48 which base member bears a set of concentric rings and radial lines such as rings 21 and lines 22 shown in FIGURE 1 and described above. The base member 20A is preferably of a circular shape with a diameter substantially equal to the diameter of the disc 48, and is formed with an axial hole 51 in alignment with the hole 49 in the disc 48. If desired, the bottom surface of the base member 20A may be provided with a pressure sensitive adhesive or the like for securing the same to the face of the disc 48. In FIGURE 11 the base member 20A is shown secured to the disc 48 by a tapered snap fastener device 52 integrally formed on a bow pin holder designated 53. The holder 53 is also shown at FIGURES 9 and 10 and comprises a flat plate 54 upon which the tapered snap fastener device 52 is formed. An annular groove 56 is formed in the tapered end 52 adjacent the plate 54, and the diameter of the fastener at the groove is about equal to the diameter of the holes 49 and 51 formed in the spool and base plates shown in FIGURE 11. The holder 53 and base member 20A are secured to the roll or spool 46 by placing the base member 20A in position on the roll and then pressing the tapered fastener 52 through the holes 51 and 49 into the position shown in FIGURE 11 wherein the edges of said holes extend into the groove 56. The cardboard or other material of which the disc 48 and adjacent plate member 20A are made is sufficiently resilient to permit insertion of the fastener and the subsequent return of the hole edges into the groove 56. In this manner both the base member 28 and bow pin holder 53 are attached to the spool 46.

The bow pin 23 is supported in an upright position adjacent the base member 20A by said holder 53. The holder includes also a flexible member 57 having the same diameter as the plate 54. It is provided with a groove 58 which extends from the edge to the center thereof. The member 57 is secured by cementing or other suitable means, not shown, to the disc 54 along a major portion of the periphery thereof as indicated at 59 in FIGURE 9. A segment adjacent the slot 58 is left open whereby a pocket 61 is formed between the plates 54 and 57 for the reception of the flange 27 on the bow pin as seen in FIGURES 10 and 11. The bow pin is held by the holder 53 by simply sliding the shank thereof through the slot 58 to the inner end of the slot. The slot terminates adjacent the center of the holder whereby the pin is positioned at the axis of the plate member 20A when slid into position as shown in FIGURES 9, 10 and 11.

With a bow pin 23 positioned in the holder a bow is formed in the same manner as described above with reference to FIGURES 1 through 6 and such method will not here be repeated. It will be noted, however, that with this construction the bow pin 23 is again located in close proximity to the base member 20A, whereby bow loops which are formed on the device by impaling a ribbon on the bow pin engage the base member 20A and remain in proper alignment thereon with the radial lines 22. Because of the natural resiliency of ribbon often used in making bows the ribbon when formed into loops is placed in compression between the barb 26 of the bow pin and the base plate 20 whereby the loops tend to remain where positioned on the base plate. This, as mentioned above eliminates the need for pegs or posts surroundnig the bow pin upon which the loops are formed in many prior art bow making devices.

To facilitate rotation of the spool 46 and attached bow making device during formation of the loops of the bow a plug 63 is inserted in the hole 49' formed in the bottom disc 48'. The plug snugly fits the hole 49' and is removable therefrom. A radial flange 64 on the bottom of the plug abuts the disc 48' in the fully inserted position of the plug illustrated in FIGURE 11. The flange provides a base upon which the spool is easily pivoted.

With the plug 63 in position a closed recess 66 is formed inside the tubular portion 47 of the spool within which a supply of bow pins may be stored. They are removed from inside this spool by first removing the plug 63 and then shaking them out through the botton hole 49'.

Figure 12:
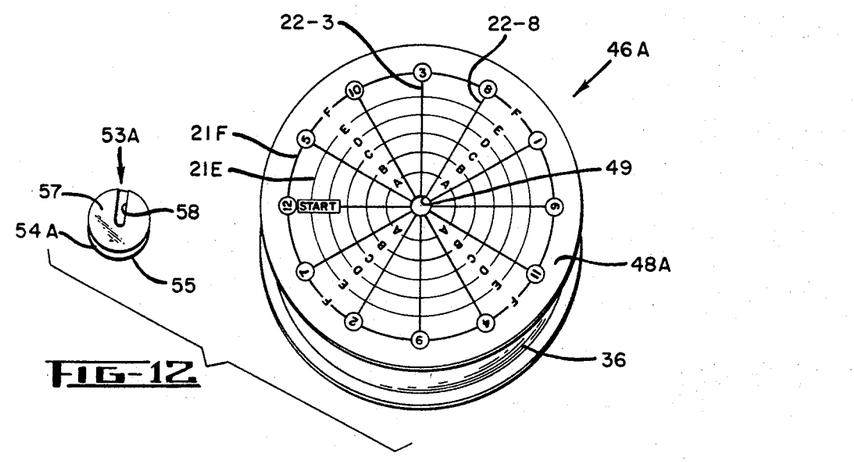
FIGURE 12 is an exploded isometric view of a bow making device of this invention which forms an integral part of a ribbon roll.

The novel apparatus of this invention may be made an integral part of a conventional ribbon roll or spool by printing the pattern of concentric circles and radial lines on one side of the roll or spool as shown in FIGURE 12. There is a conventional spool 46A shown upon which ribbon 36 is wound. The novel pattern of concentric circles 21 and radial lines 22 is shown printed or otherwise suitably formed directliy upon one end disc 48A, with the center of the pattern at the center of the hole 49 which, in turn, is located at the center of the disc 48A.

Figure 7:
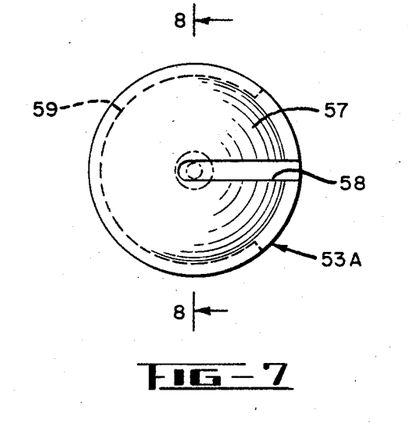
FIGURE 7 is a plan view of one embodiment of a holder for holding the bow pin of the bow on the base member.
Figure 8:
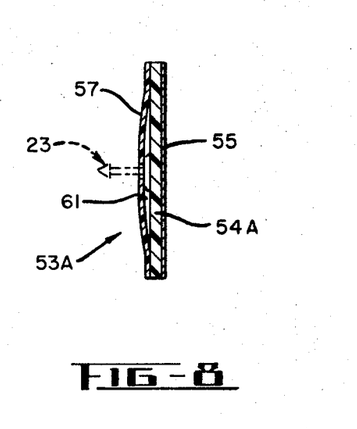
FIGURE 8 is a cross sectional view taken on line 8—8 of FIGURE 7.

A bow pin holder designated 53A which is suitable for attachment to the face of the spool at the center of the pattern printed thereon is shown in FIGURE 12 and also in FIGURES 7 and 8 to which figures reference is now made. The holder 53A is similar to the holder 53 shown in FIGURES 9, 10 and 11 and described above and comprises a pair of interconnected plates 54A and 57 which are fastened together to form a pocket 61 therebetween. A slot 58 is formed in the upper flexible plate 57 through which the shank of the bow pin extends when held by the holder. The bottom of the plate 54A is flat and may be coated with a pressure sensitive adhesive 55 or the like whereby the holder may be attached to the center of the side wall 48A of the spool by simply pressing the same thereagainst. With the holder 53A in position at the center of the pattern a bow pin 23 may be inserted into the pocket 61 along the slot 58. With the bow pin in position, the apparatus is in condition for the formation of a bow thereon in the manner described above with reference to FIGURES 1 through 6. By attaching the holder 53A to the spool with pressure sensitive adhesive it may be attached to and removed from the spool a number of times as desired. It will here be understood that a holder 53 of the type shown in FIGURES 9 through 11 may be used, if desired, by simply inserting the fastener 52 thereof through the hole 49 in the end plate 48 of the spool 46A shown in FIGURE 12.

Figures 13, 14:
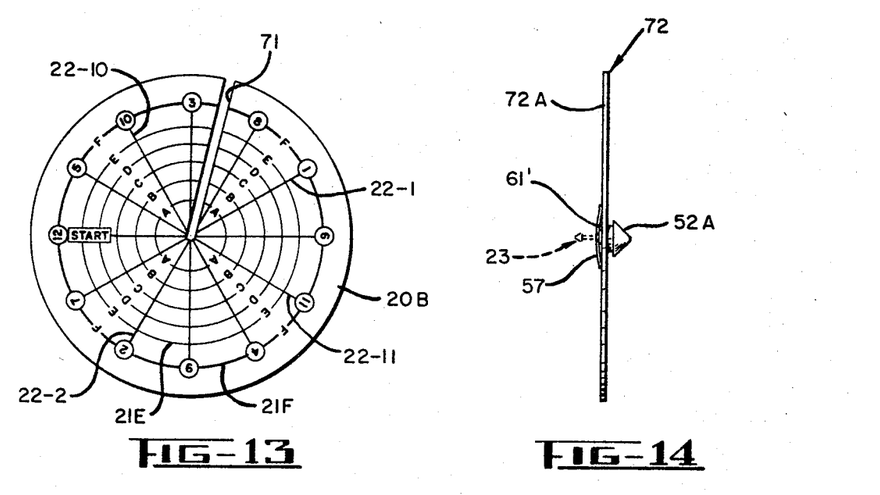
FIGURE 13 is a plan view of a modified form of base member included in another embodiment of this invention.
FIGURE 14 is a side elevational view of yet another modified form of base member adapted for attachment to one face of a ribbon roll.

It will be apparent that changes and modifications may be made in the apparatus without departing from the spirit of the invention. For example, in FIGURE 13 of the drawings there is shown an apparatus which is similar to that shown in FIGURE 1 and described above. In FIGURE 13 a circular shaped flat plate or base member 20B is shown with the novel pattern of concentric circles 21 and radial lines 22 formed thereon. Instead of a keyhole shaped slot, the plate 20B is shown provided with an elongated slot 71 which extends from the edge of the plate to the center of the pattern thereon. A bow pin 23 (of the type shown in FIGURE 11 and described above) may be inserted through the slot and slid to the center of the pattern. By placing the apparatus on a flat surface it is in condition for the formation of a bow in the manner described above with reference to FIGURES 1 through 6. The bow is removed from the plate by sliding the bow pin along the slot 71 and out the end thereof.

In another embodiment of this invention illustrated in FIGURE 14 a circular plate 72 is provided which has a pattern of concentric circles and radial lines (not shown) of the type shown in FIGURE 12 on the face of 72a thereof. A pocket 61' for support of bow pins in an upright position is formed by attachment of a flexible member 57 (of the same type shown in FIGURES 7 through 11) to the face 72a of the base plate 72 at the center thereof. A tapered fastener element 52a may be secured to the back plate 72 at the center by any suitable means, not shown. The base plate is secured to the side of a conventional ribbon roll or spool (such as a spool of the type shown in FIGURE 12) by simply inserting the fastener 52a into the hole 49 formed in the center of the spool. Bows are formed which the device in the same manner described above with reference to FIGURES 1 through 6. In one arrangement both the plate 72 and member 57 may be made of thermoplastic material secured together along a portion of the edge of the member 57 by heat sealing. If desired, the fastener 52a may be omitted from the plate 72, and the plate secured to the side of a ribbon roll by any suitable means, not shown. As a further modification, the plate 72 itself may comprise one side of the ribbon roll.

Figure 15:
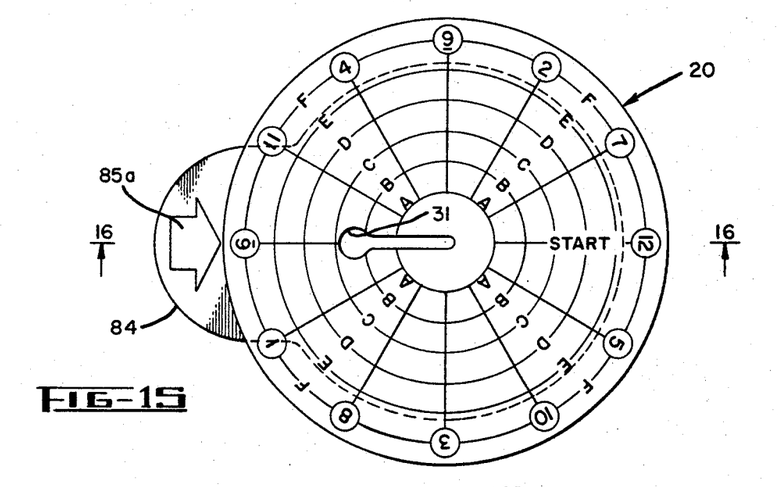
FIGURE 15 is a plan view of a bow making device similar to that shown in FIGURE 1 but supported for easy rotation on a base.
Figures 16, 17, 18, 19:
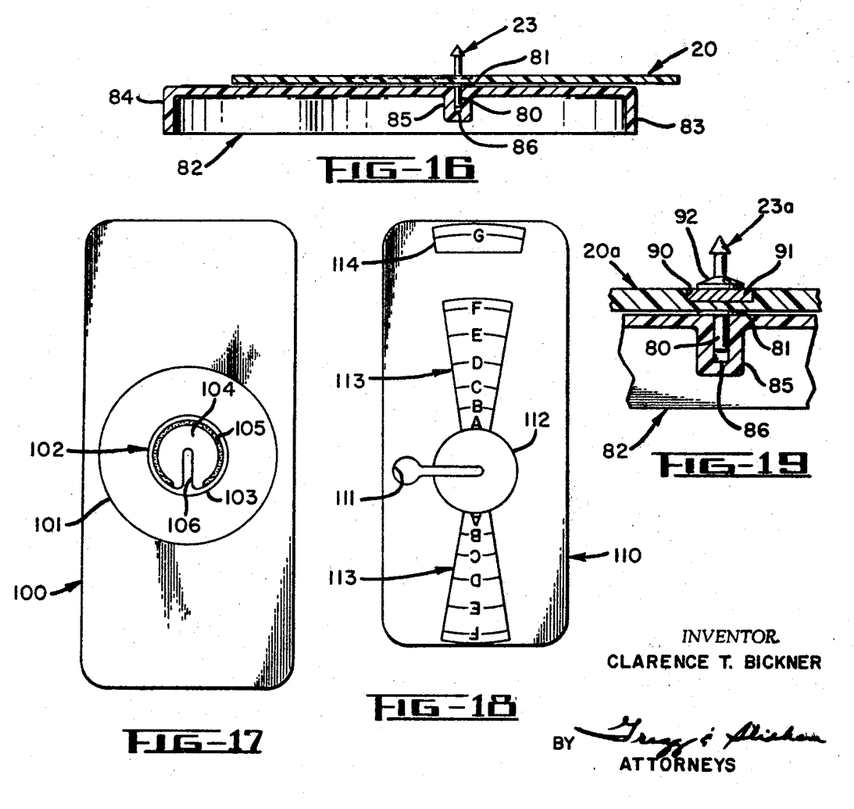
FIGURE 16 is a section view taken along the line 16—16 of FIGURE 15.
FIGURE 17 is a plan view of a greatly simplified form of the invention.
FIGURE 18 is a plan view of another simplified form of the invention.
FIGURE 19 is a fragmentary vertical sectional view of a modification of the device of FIGURE 16, showing a magnetic means for detachably holding a bow pin.

Referring now to FIGURES 15 and 16, another embodiment of the invention is there shown. A circular, disc-like bow maker 20 is shown which is essentially the same as that shown in FIGURE 1, such bow-making device having a keyhole slot 31 into which a bow pin 23 is fitted as shown in FIGURE 16. Projecting coaxially from the underside of the bow making disc 20 is a pin 80 affixed to a base 81 which in turn is affixed to the underside of the disc 20 by any suitable means such as an adhesive. The assembly thus described, that is to say, the disc 20 with the downwardly projecting pin 80, is mounted on a base 82 having a circular body portion 83 and a projecting tongue 84 on which is inscribed an arrow 85. The body portion 83 is formed with a downwardly projecting, centrally located member formed with a socket 86 to receive the pin 80.

It will be apparent that, by this means, the bow making disc 20 can be rotated readily on the base 82 to any desired position. In practice, the disc 20 is rotated so that its start position at the peripheral number 12 is opposite the indicator arrow 85; the first loop of the bow is formed in the manner described above, then the disc 20 is rotated until the number one position is brought into a similar position opposite the indicator arrow 85; the next loop is formed, etc. until a complete bow has been prepared.

Referring now to FIGURE 17, a greatly simplified bow making device is there illustrated which is generally designated by the reference numeral 100. As illustrated, this device is rectangular in shape, although other shapes (e.g. square and circular) may be employer. A single circle 101 is shown concentric to the position to be occupied by a bow pin. A bow pin holder 102 is shown similar to that as shown in FIGURES 7 and 8, such bow pin holder comprising a base portion 103 affixed by a suitable means such as adhesive to the base 100; a top portion generally of plastic material shown at 104 and which is affixed along its outer edge at 105 to the base portion 103, for example, by means of adhesive, such top portion 104 being formed with a radial slot 106 to receive a bow pin.

In this simplified form of device, means are provided for holding a bow pin erect with its spike portion projecting upwardly, such means permitting detachment of the bow pin when a bow has been completed. Meanwhile, the base 100 provides a flat surface adjacent the base of the bow pin for ease of forming a bow, and a single circle 101 provides a guide for forming a simple type of bow. Other marks (not shown) may be placed according to the user's desires for guiding the formation of bows of different types and radii.

Referring now to FIGURE 18, another simplified embodiment of the invention is there shown which is generally designated by the reference numeral 110, which, like the device of FIGURE 17, is in the form of a flat rectangular base made of any suitable material, such as cardboard, plastic, metal, wood or the like. A keyhole slot is formed at 111 and a guide circle 112 is provided which is concentric to a bow pin seated in operating position in the keyhole slot 111. Sectors 113 are shown which are diametrically opposite to one another, and which are formed with arcs and imprinted with the letters A, B, C, D, E and F, such being employed to act as guides in forming a bow in a manner which will be apparent. An outer sector is shown 114 at a greater radius from the bow pin.

In this form of device the arcs A through F are employed to form bows in a manner which will be apparent, and the more remote arc denoted as G may be used to form an extra long loop to serve as a distinctive part of a bow or as a bundle for a party favor.

In the embodiment of FIGURES 17 and 18, a bow is made as with the embodiments of FIGURES 1 to 6 but without benefit of guide characters throughout 360°. Thus, in the use of the device of FIGURE 17, a ribbon is impaled at one end on a bow pin seated in slot 106; a length of this ribbon is formed into a loop having a length approximately equal to the radius of circle 101; the ribbon is again impaled on the bow pin to complete and secure the loop; then the base 100 is rotated to a convenient position to form the next loop, which is formed at any desired angle in relation to the first loop; and this process is repeated until the loop is completed.

In the device of FIGURE 18, essentially the same procedure is followed, with each loop having a length determined by the selected arc A, B, C, etc.; and after each loop is formed the bow is rotated relatively to the base so that it is convenient to form the next loop.

Referring now to FIGURE 19, a modification of the device of FIGURES 15 and 16 is there shown, wherein the bow making disc is indicated as 20a and is shown as being formed with a central socket 90 which receives a small permanent magnet 91. The bow pin 23a has a base 92 formed with (or containing) a suitable ferromagnetic material such as soft iron or iron filings. By this means it will be apparent that the bow pin 23a is detachably secured in place by magnetic means which will permit detaching it when a bow has been completed.

A still further means of detachably securing a bow pin to any of the bow making devices of this invention is with a pressure sensitive adhesive applied either to the central area of the bow making device or, preferably, to the base of the bow pin.

Figure 20:
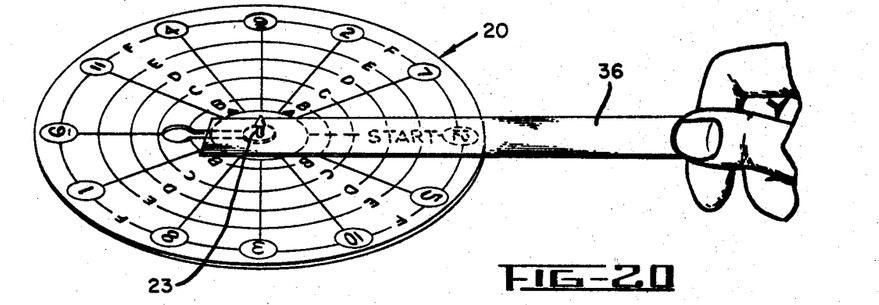
FIGURES 20, 21 and 22 are perspective sequential views of the device of the invention showing how a simple loop or point of a bow can be easily and accurately made.
Figure 21:
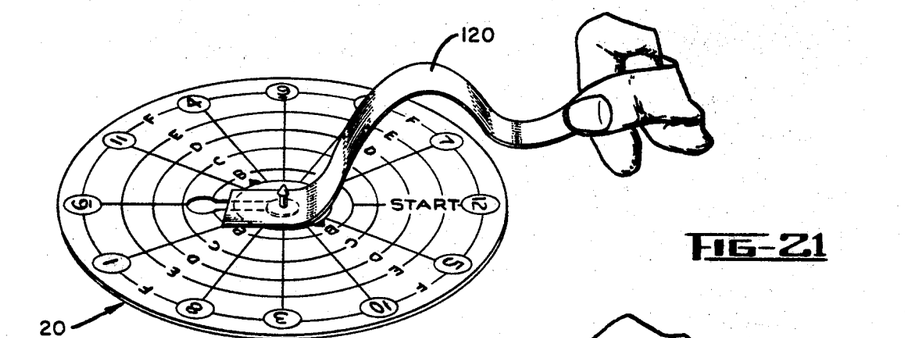
Figure 22:
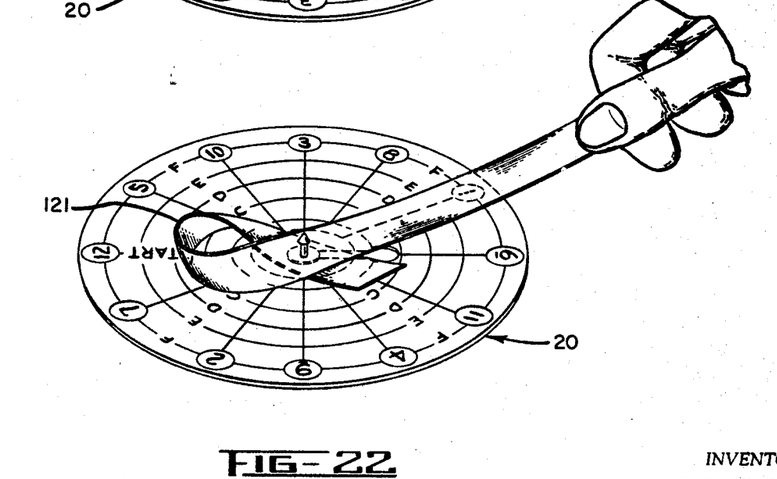

Referring now to FIGURES 20, 21 and 22, a convenient way of using the bow making device of the invention is there illustrated. As shown in FIGURE 20, a ribbon 36 is impaled at one end of a bow pin 23 seated in the keyhole slot and the ribbon is grasped by hand at some distance, for example about an inch or two, from the periphery of the bow making disc 20. Then, as illustrated in FIGURE 21, the length of ribbon held in this manner is moved inwardly to form a hump 120. Then, the bow making disc 20 is rotated with the ribbon held substantially in this manner, and it will be found that a loop 121 will automatically form and that the ribbon beyond the bow pin 23 will project in the proper direction for forming the next loop. This process will be repeated. That is to say, during each step or cycle the ribbon will be grasped and held as indicated in FIGURE 20, then a hump will be formed as shown in FIGURE 21, then a loop will be formed and impaled on the bow pin as shown in FIGURE 22, etc.

Other changes and modifications may suggest themselves to those skilled in this art and it is intended that such changes and modifications shall fall within the spirit and scope of the invention as recited in the following claims.

I claim:

1. A bow-making device comprising a base having a flat working surface and formed with centrally located attachement means for detachably securing a bow pin having a widened base portion and a spike portion projecting upwardly from said base portion:

said attachment means permitting easy insertion of the bow pin with its base portion adjacent said working surface and said spike portion projecting upwardly directly from said working surface;

said working surface being formed with a plurality of concentric visible guide circles spaced inwardly of the perimeter of the base and having said attachment means at its cetner;

said device also comprising a bow pin inserted in said attachment means, such bow pin having a widened base portion and a spike portion projecting therefrom, said base portion being held adjacent said working surface by said attachment means and said spike portion projecting upwardly directly from said working surface.

2. The bow making device of claim 1 wherein a plurality of visible radial guide lines are formed on said working surface radiating from said attachment means and bow pin.

References Cited

UNITED STATES PATENTS

| | | | |
|---|---|---|---|
| 3,044,670 | 7/1962 | Barefoot | 223—46 |
| 3,300,107 | 1/1967 | Koch | 223—46 |
| 2,088,455 | 7/1937 | Witt | 28—15 |
| 3,061,153 | 10/1962 | Rector | 223—46 |
| 3,136,459 | 6/1964 | Mashburn | 223—46 |
| 3,193,162 | 7/1965 | Montoya | 223—46 |
| 3,194,459 | 7/1965 | Knox | 223—46 |

JORDAN FRANKLIN, *Primary Examiner.*

G. V. LARKIN, *Assistant Examiner.*